(12) United States Patent
Yumoto

(10) Patent No.: US 7,330,976 B2
(45) Date of Patent: Feb. 12, 2008

(54) ACCESS CONTROL SYSTEM AND METHOD

(75) Inventor: Katsuyuki Yumoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 10/820,839

(22) Filed: Apr. 9, 2004

(65) Prior Publication Data

US 2004/0244013 A1     Dec. 2, 2004

(30) Foreign Application Priority Data

Apr. 9, 2003   (JP) ............................. 2003-104756

(51) Int. Cl.
*G06F 9/00*   (2006.01)

(52) U.S. Cl. ...................... 713/182; 713/165; 713/167; 713/189; 713/193

(58) Field of Classification Search ................ 713/182, 713/165, 167, 189, 193
See application file for complete search history.

(56) References Cited

OTHER PUBLICATIONS

Satoh et al., "Compartmented Mode Operating System," *Proceedings (5) of 65th National Meeting of Information Processing Society of Japan*, Section 2T9-4/5, 4 pp. (With English abstract).

*Primary Examiner*—Thomas R. Peeso

(57) ABSTRACT

Device files are disposed on respective routes through which a process accesses the same device, and access rules for those device files are unified. Foe example, where there exist two routes by which a certain process accesses a device, two device files are disposed on each of the routes. Access rules that are set for all directories that access the two device files are unified so as to permit only reading so that the device file can be accessed according to the same access rule by the two routes.

14 Claims, 13 Drawing Sheets

ACCESS CONTROL SYSTEM AND METHOD

BACKGROUND OF THE INVENTION

1. Field of the Invention

The present invention relates to an access control system and method for controlling access to a device of a computer.

2. Description of the Related Art

UNIX (registered trademark) is commonly used as an operating system (OS) of computers. And LINUX, which is a personal-computer-oriented version of UNIX, has spread in recent years.

For example, "Compartmented Mode Operating System," Proceedings (5) of 65th National Meeting of Information Processing Society of Japan, Section 2T9-4/5, page 555, 2003 discloses a method for remedying the vulnerability of the above and like OSs.

SUMMARY OF THE INVENTION

The present invention has been made in the above circumstances, and an object of the invention is therefore to provide an access control system and method capable of remedying the vulnerability of a computer OS and thereby increasing its security.

[Access Control System]

To attain the above object, the invention provides an access control system comprising an operating system; and an access control device for controlling access from each of one or more processes that are executed by the operating system to one of one or more devices, wherein each of the processes accesses one of the devices via a device file or one of device files corresponding to the one device; a plurality of device files may be generated for each of arbitrary ones of the devices; the operating system comprises device file generating means for generating a device file or device files for a route or respective routes by which each of the processes accesses one of the devices; access rule setting means for setting, for routes, access rules indicating methods for accessing device files, respectively; and access control means for controlling access to each device file according to the access rule; the access control device unifies access rules that are set for routes to a plurality of device files corresponding to a common device; and the access control means controls access to each device file according to a unified access rule if the access rules have been unified.

[Access Control Device]

The invention also provides an access control device for controlling access from each of one or more processes to one of one or more devices, wherein each of the processes accesses one of the devices via a device file or one of device files corresponding to the one device; a device file or device files are generated for a route or respective routes by which each of the processes accesses one of the devices; access rules indicating methods for accessing device files are set for routes, respectively; access to each device file is controlled according to an access rule; and a plurality of device files may be generated for each of arbitrary ones of the devices, the access control device comprising access rule extracting means for extracting access rules that are set for routes to a plurality of device files corresponding to a common device; and access rule deriving means for deriving a unified access rule for each device on the basis of the extracted access rules.

[Access Control Method]

Further, the invention provides an access control method for controlling access from each of one or more processes to one of one or more devices, wherein each of the processes accesses one of the devices via a device file or one of device files corresponding to the one device, the access control method comprising the steps of generating a device file or device files for a route or respective routes by which each of the processes accesses one of the devices, a plurality of device files being generated possibly for each of arbitrary ones of the devices; setting, for routes, access rules indicating methods for accessing device files, respectively; extracting access rules that are set for routes to a plurality of device files corresponding to a common device; deriving a unified access rule for each device on the basis of the extracted access rules; and controlling access to each device file according to the unified access rule.

[Program]

Still further, the invention provides a program for controlling access from each of one or more processes to one of one or more devices, wherein each of the processes accesses one of the devices via a device file or one of device files corresponding to the one device, the program causing a computer to execute the steps of generating a device file or device files for a route or respective routes by which each of the processes accesses one of the devices, a plurality of device files being generated possibly for each of arbitrary ones of the devices; setting, for routes, access rules indicating methods for accessing device files, respectively; extracting access rules that are set for routes to a plurality of device files corresponding to a common device; deriving a unified access rule for each device on the basis of the extracted access rules; and controlling access to each device file according to the unified access rule.

DESCRIPTION OF THE PREFERRED EMBODIMENTS

[Background of the Invention]

Prior to the description of the embodiments, to help understand those, the background against which an access control method according to the present invention has been made will be described and the access control method according to the invention will be outlined.

[Problems that Occur in Accessing a Device]

Figure 1:
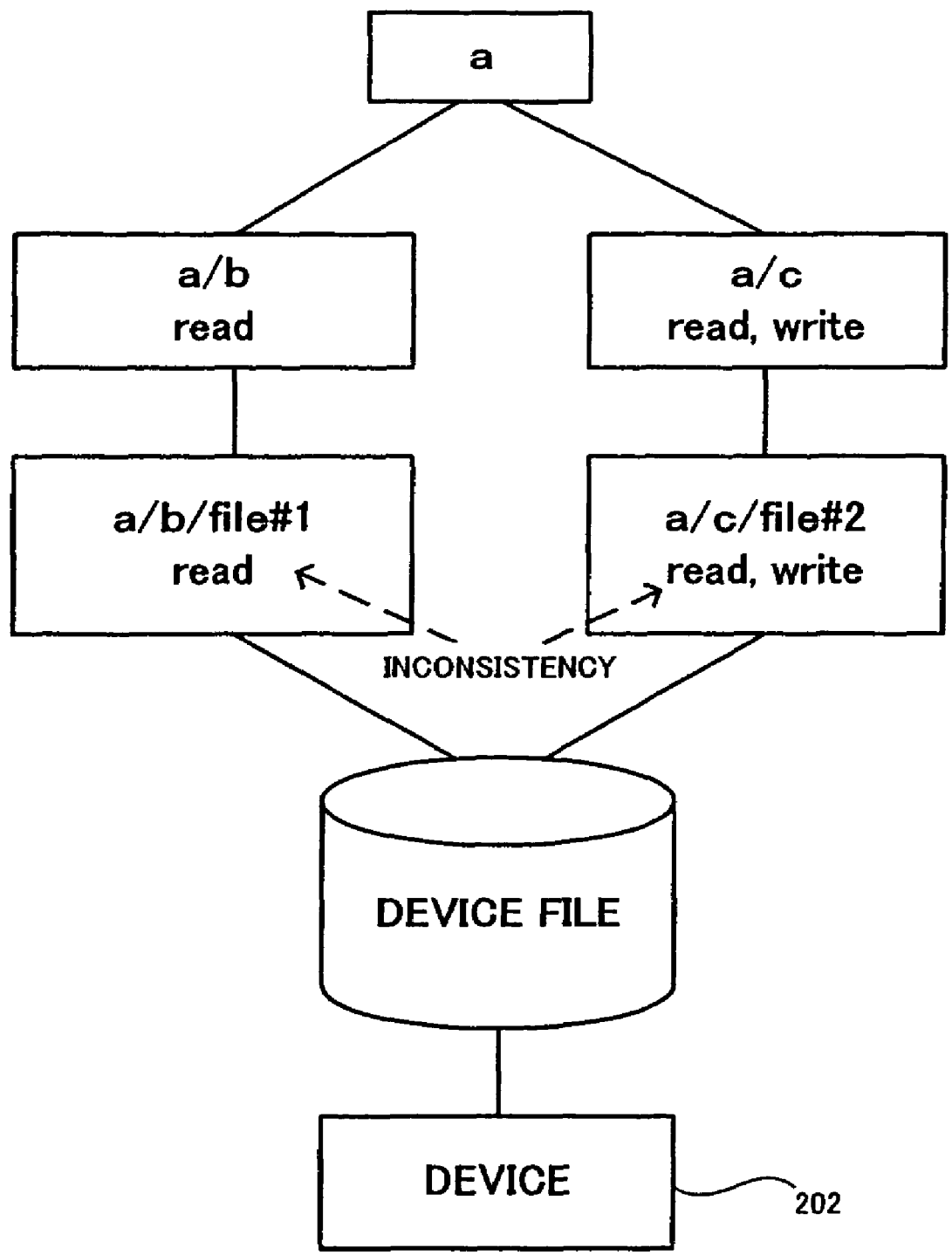
FIG. 1 illustrates a specific background technique of the invention.

FIG. 1 illustrates a specific background technique of the invention.

For example, in an OS that performs processing similar to processing performed by UNIX (registered trademark) and LINUX, device file entities (hereinafter also called "device files") that are provided for respective resources (hereinafter also referred to as "devices") such as a storage device, an interface, and an output device of a computer are used to allow a process being executed to access those devices.

For example, as shown in FIG. 1, a process being executed accesses a device by accessing a device file linked to "file#1" via "file#1" in a directory "a/b."

Also as shown in FIG. 1, the process being executed accesses the same device by accessing a device file linked to "file#2" via "file#2" in a directory "a/c."

A rule of access to a certain device file (hereinafter also referred to as "access rules") is determined for each directory.

As shown in FIG. 1, for example, for the directory "a/b," an access rule is set so as to permit only reading for access to the device file. For the directory "a/b," an access rule is set so as to permit both of reading and writing for access to the device file.

In practice, directories a, b, and c are given such names as "root," "dev," and "temp," respectively.

In the above described case, although a certain process accesses the same device file, only reading from the device file is permitted when the process accesses it via "file#1" in the directory "a/b" and both of reading from and writing to the device file are permitted when the process accesses it via "file#2" in the directory "a/c."

An inconsistency may occur in execution of a process if, as described above, the access rule to be applied varies depending on the routes taken (including files and directories linked to each other) between the process and a device file though which the process accesses the same device.

[Outline of the Invention]

Figure 2:
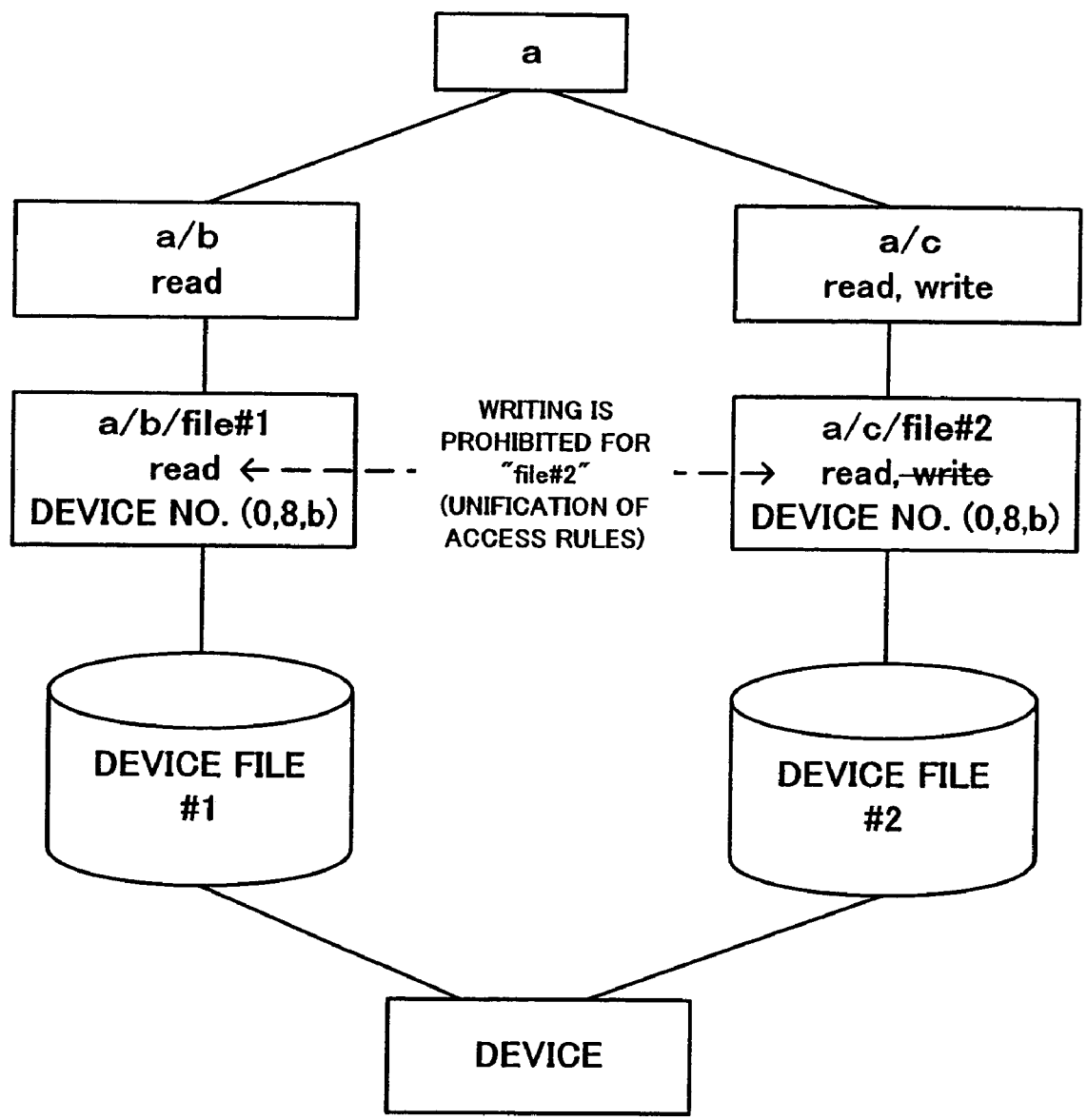
FIG. 2 illustrates a specific example of the invention for the purpose of outlining it.

FIG. 2 illustrates a specific example of the invention for the purpose of outlining it.

Although a single device, two device files, and two files linked to the respective device files are shown in FIG. 2, these numbers are just examples. Also, the directory structure is just an example. That is, in the access control method according to the invention, there are no limitations on the numbers of devices, device files, and files linked to the device files and the directory structure.

Further, the access rules shown in FIG. 2 are just examples and the access control method according to the invention is not limited to those access rules.

An inconsistency or a discrepancy can be prevented from occurring between access rules by disposing device files on respective routes that may be taken by a process (may not be a single process) to access the same device and unifying the access rules for those device files, as shown in FIG. 2.

More specifically, in the case where a plurality of routes can be taken by a certain process to access a device, first, device files (#1 and #2) are disposed on the respective routes as shown in FIG. 2.

Then, if there is a difference between access rules for access, to the device files #1 and #2, from all directories ("a/b" and "a/c") where files ("file#1" and "file#2") to access the respective device files #1 and #2 exist, the access rules are unified; for example, writing is prohibited and only reading is permitted.

Accessing device files according to a unified access rule can eliminate inconsistencies or discrepancies between access rules for respective directories, prevent occurrence of problems in execution of a process, and reduce the degree of vulnerability of an OS.

For example, to increase the security of an OS, as shown in FIG. 2, it is appropriate to employ, as a unified access rule, the most restrictive one of access rules for respective directories.

For example, to increase the performance of an OS, it is appropriate to employ, as a unified access rule, an access rule for a route that is used most frequently among a plurality of routes.

For example, when a device to be accessed has a characteristic of a read only device that is meaningless for operations other than reading and when a file included in a route has a specific characteristic, it is appropriate to employ, as a unified access rule, an access rule that is most suitable to access the device through the route including the file.

Embodiment 1

A first embodiment of the invention will be hereinafter described.

[Computer 1]

Figure 3:
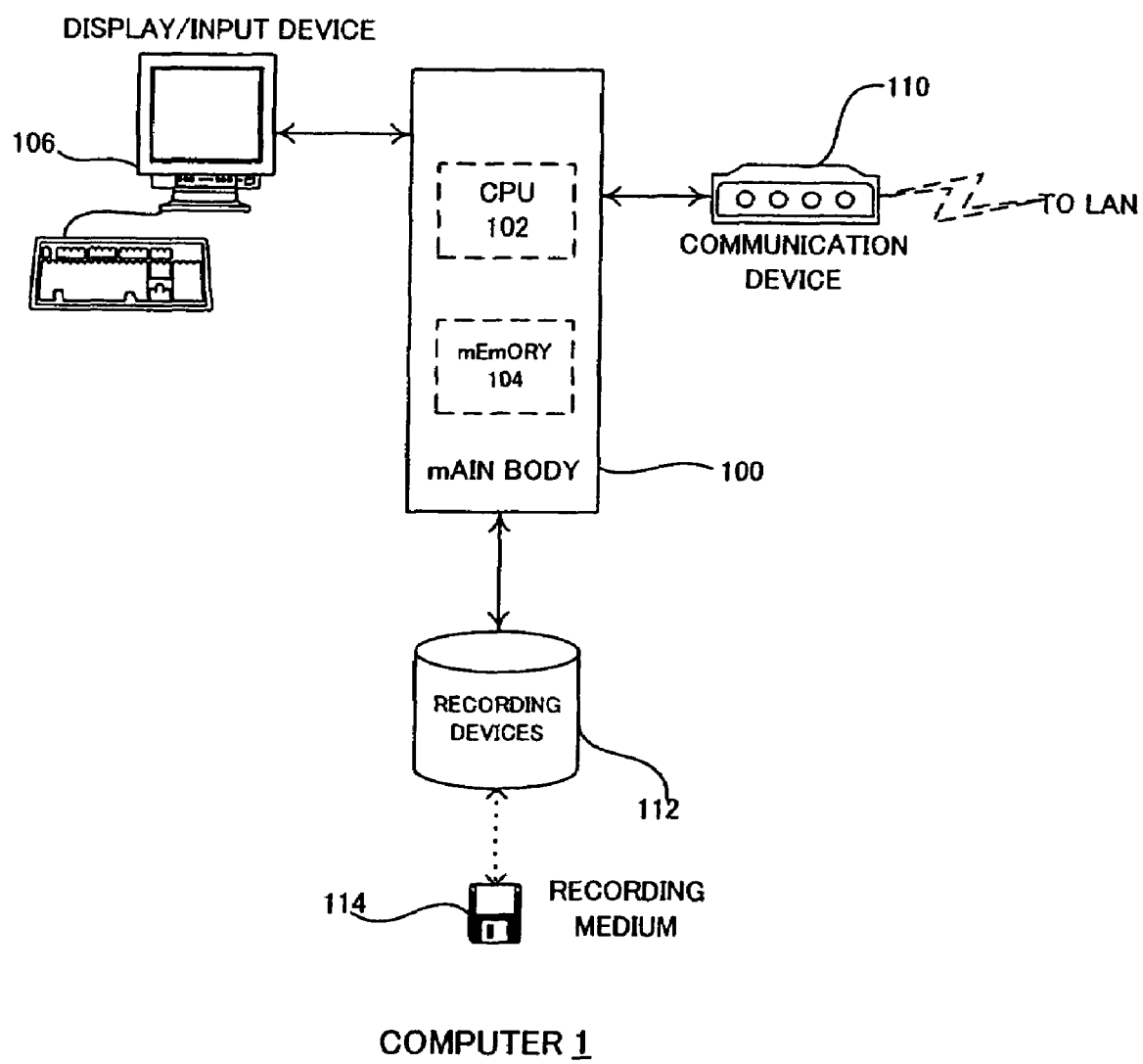
FIG. 3 shows the hardware configuration of a computer 1 to which an access control method according to the invention is applied.

FIG. 3 shows the hardware configuration of a computer 1 to which the access control method according to the invention is applied.

As shown in FIG. 3, the computer 1 is composed of a main body 100 including a CPU 102, a memory 104 and their peripheral circuits, etc., a display/input device 106 including a display device, a keyboard and a mouse, etc., a communication device 110 for communicating with other computers etc. (not shown) via a network, recording devices 112 such as a hard disk drive and a CD device, and a recording medium 114 that can be inserted into and removed from the recording devices 112. That is, the computer 1 has components of an ordinary computer.

Among the components of the computer 1, an interface provided inside the main body 100, the display/input device 106, the communication device 110 and the recording devices 112, etc. are devices as subjects of access shown in FIGS. 1 and 2.

[OS 2 and First Utility Program 30]

Figure 4:
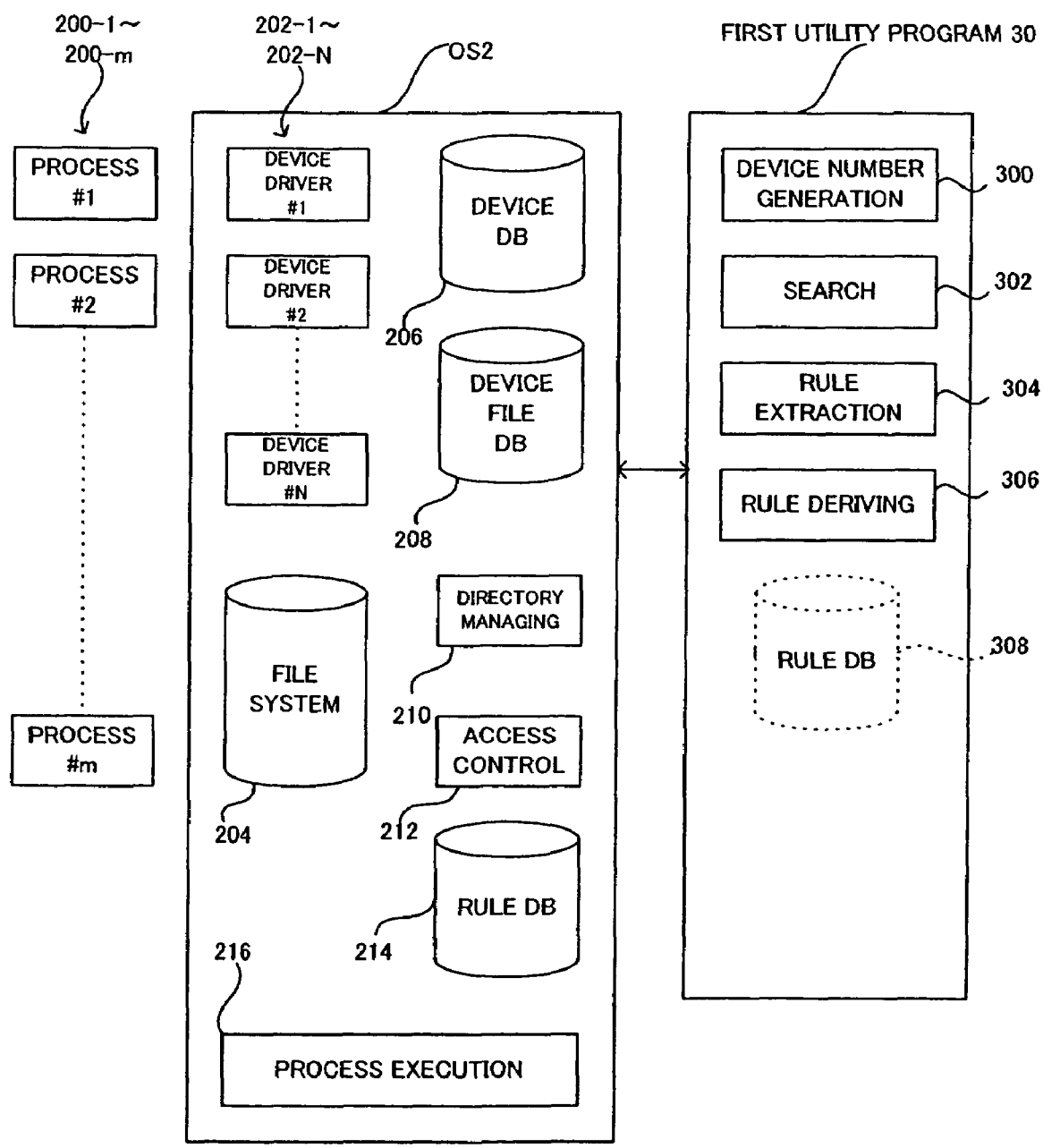
FIG. 4 shows the configuration of an OS that runs on the computer of FIG. 3 and the configuration of a first utility program for realizing the access control method according to the invention.

FIG. 4 shows the configuration of an OS 2 that runs on the computer 1 shown in FIG. 3 and the configuration of a first utility program 30 for realizing the access control method according to the invention.

As shown in FIG. 4, the OS 2 is composed of device drivers 202-1 to 202-n (n≧1), a file system 204, a device database (DB) 206, a device file database (DB) 208, a directory managing unit 210, an access control unit 212, a rule database (DB) 214, and a process execution unit 216.

The first utility program 30 is composed of a device number generation unit 300, a search unit 302, a rule extraction unit 304, and a rule deriving unit 306, etc.

As indicated by a broken line in FIG. 4, the rule DB 214 may be provided in the first utility program 30 rather than in the OS 2.

The manner of division of the components of the OS 2 is just an example. For example, the databases such as the device database 206 may be provided in the file system 204.

In the following description, such an expression as "device diver(s) 202" is used to refer to all or an unspecified part of a set of components such as the device drivers 202-1 to 202-n.

The OS 2 and the first utility program 30 are supplied to the computer 1 via the recording medium 114 (see FIG. 3), for example, and run by the computer 1.

The OS 2 executes processes 200-1 to 200-m (m≧1) by means of its components, and controls access to such devices as the display/input device 106 (see FIG. 3) according to access rules that are set by the first utility program 30.

As described above with reference to FIG. 2, when there are a plurality of attempts of access to the same device via a plurality of routes, the first utility program 30 unifies access rules for respective device files (see FIG. 2) that are generated for the respective routes and sets a unified access rule in the OS 2.

In the OS 2, the device drivers 202 receive accesses from the processes 200 via device files to operate the display/input device 106 etc.

The file system 204 stores and manages files (including device files) on a directory-by-directory basis.

The device database 206 correlates identifiers of devices with their device numbers to store and to manage them.

The device file database 208 correlates device files with device numbers to store and to manage them.

The directory managing unit 210 manages the directories in the file system 204.

The rule database 214 receives settings of access rules for the device files, the access rules being set for the respective directories in the file system 204 to store and to manage the thus-set access rules.

As described above, each of the access rules set in the rule database 214 for the respective directories or device files specifies whether access to the corresponding device file is permitted only for reading, only for writing, or for both of reading and writing, or prohibited for both of reading and writing.

An access rule is set in the rule database 214 by a user's setting manipulations on the display/input device 106 (see FIG. 3) of the computer 1 or a notice from the first utility program 30.

The access control unit 212 controls, according to access rules stored in the rule database 214, accesses from processes 200 to device files and accesses to device files from files linked to the device files on the routes between processes 200 and the device files.

The process execution section 216 executes the processes 200.

In the first utility program 30, the search unit 302 searches the device file database 208 to acquire the device files and information indicating device numbers etc. of devices corresponding to the device files.

The device number generation unit 300 analyzes information acquired by searching the device file database 208 to generate device numbers of devices corresponding to the device files.

The rule extraction unit 304 searches the rule database 214 to extract, for accesses to respective device files, access rules set for respective directories or the device files.

The rule deriving unit 306 derives a unified access rule by unifying the extracted access rules that are set for accesses from a plurality of directories to the same device so that, as described above, the conditions of access to device files become strictest.

Alternatively, the rule deriving unit 306 derives a unified access rule by employing one of the plurality of access rules.

As a further alternative, the rule deriving unit 306 derives a unified access rule by unifying the plurality of access rules in accordance with properties of files that are linked to the device files.

In this manner, the rule deriving unit 306 derives an access rule for each of devices by unifying access rules for respective directories corresponding to a plurality of device files of the same device to store the derived access rules in the rule database 214 of the OS 2.

[Operation of First Utility Program 30]

Figure 5:
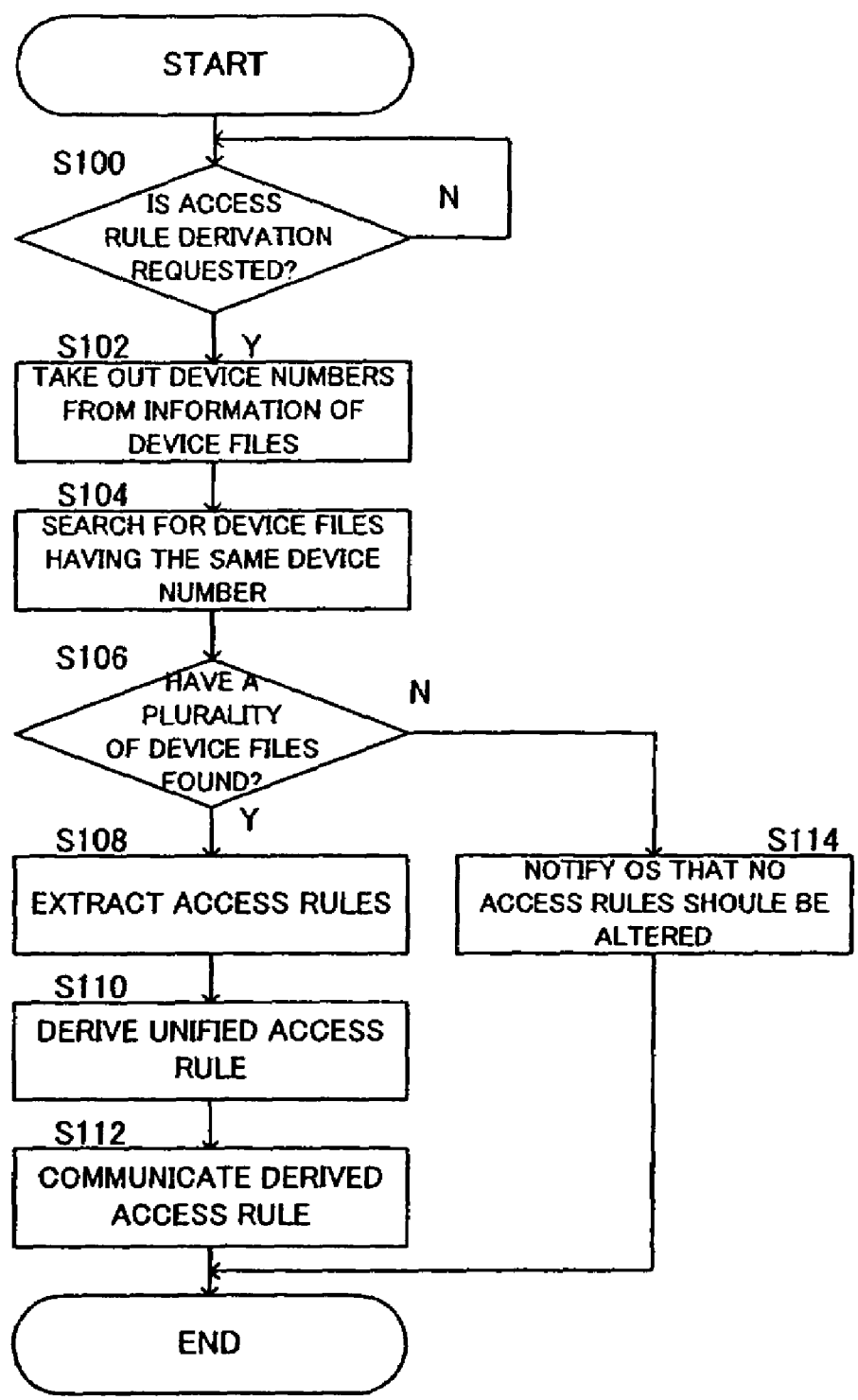
FIG. 5 is a flowchart of an operation S10 of the first utility program shown in FIG. 4.

FIG. 5 is a flowchart of an operation S10 of the first utility program 30 shown in FIG. 4.

Upon occurrence of an attempt of access to a device file in the OS 2, the access control unit 212 of the OS 2 issues an access rule derivation request including information indicating the access-attempted device file to the first utility program 30.

As shown in FIG. 5, at step S100, the first utility program 30 determines whether an access rule derivation request has come from the OS 2 or not.

The first utility program 30 moves to step S102 if an access rule derivation request has come from the OS 2. Otherwise, the first utility program 30 stays at step S100.

At step S102, the search unit 302 searches the device file database 208 of the OS 2 to acquire information of all the device files.

The device number generation unit 300 takes out a device number of a device corresponding to the device file from the information of each device file acquired through the search.

At step S104, the rule extraction unit 304 searches the thus-obtained device numbers for the same device number (s) as the device number of the device corresponding to the access-attempted device file.

At step S106, the rule extraction unit 304 determines whether a plurality of device numbers that are the same as the device number of the device corresponding to the access-attempted device file have been found as a result of the search or not.

The first utility program 30 moves to step S108 if a plurality of identical device numbers have been found as a result of the search. Otherwise, the first utility program 30 moves to step S114.

At step S108, the rule extraction unit 304 searches the rule database 214 of the OS 2 to acquire information of access rules set for all device files to be used for accessing the device having the same device number as the identical device numbers found at step S106.

The rule extraction unit 304 extracts the access rules from the information acquired as the result of the search.

At step S110, the rule deriving unit 306 derives a unified access rule of the extracted access rules. That is, the rule deriving unit 306 unifies the access rules set for respective directories including files linked to the plurality of device files corresponding to the device having the above device number.

At step S112, the rule deriving unit 306 notifies the OS 2 of the derived access rule.

Notified of the access rule at step S112, the rule database 214 of the OS 2 alters the access rules concerned according to the notice. The access control unit 212 controls the access to the device file according to the altered access rules.

At step S114, the rule deriving unit 306 notifies the OS 2 that no access rules should be altered. In this case, the rule database 214 of the OS 2 does not alter the access rules.

[Operation of OS 2]

Next, an access-control-related operation of the OS 2 will be described.

Figure 6:
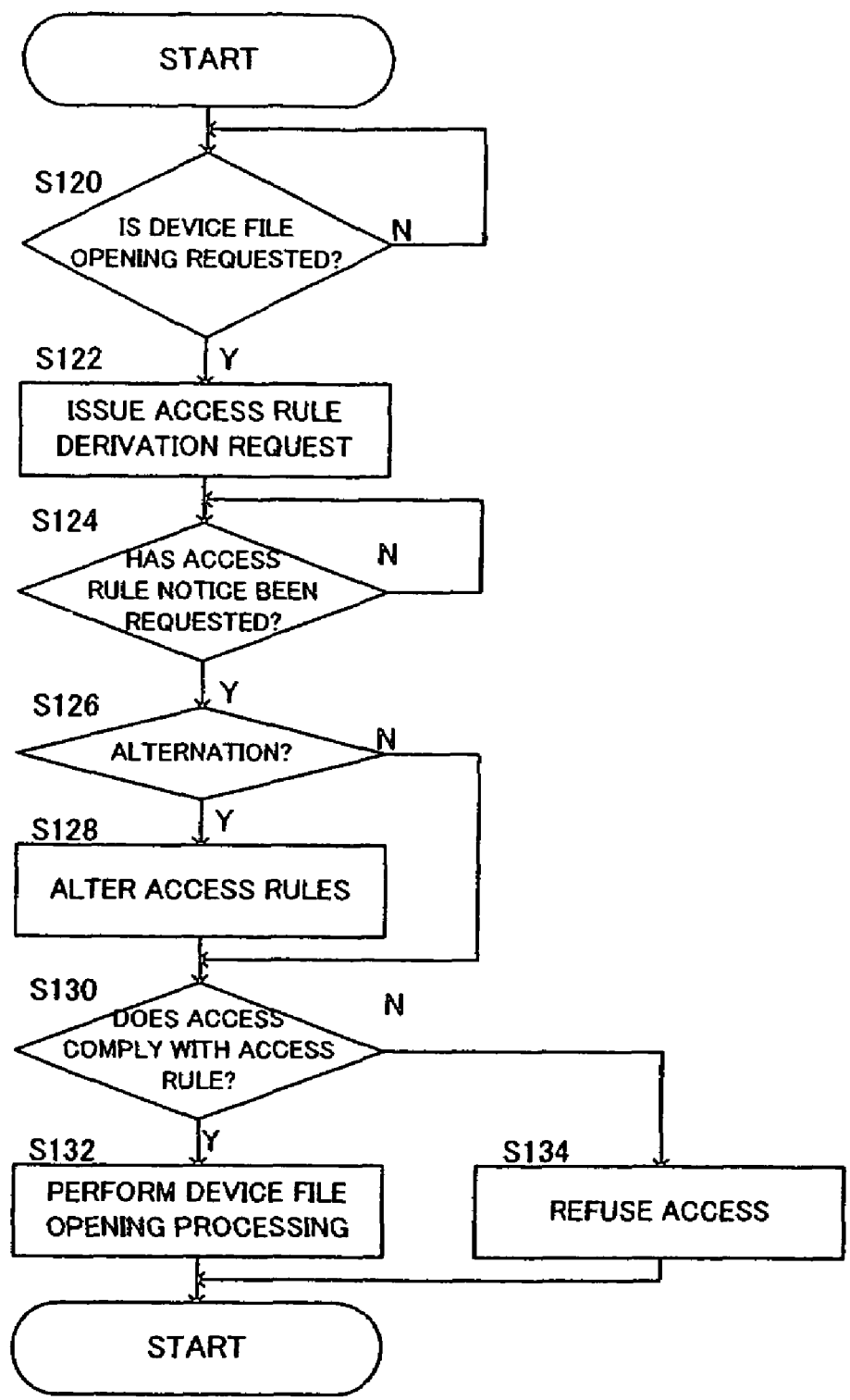
FIG. 6 is a flowchart of an access-control-related operation S12 of the OS shown in FIG. 4.

FIG. 6 is a flowchart of an access-control-related operation S12 of the OS 2 shown in FIG. 4.

As shown in FIG. 6, at step S120, the access control unit 212 of the OS 2 determines whether a process 200 or a file linked to a device file has requested file opening to access the device file or not.

The OS 2 moves to step S122 if file opening has been requested. Otherwise, the OS 2 stays at step 120.

At step S122, the access control unit 212 issues an access rule derivation request to the first utility program 30. Upon reception of the access rule derivation request, the first utility program 30 executes the process shown in FIG. 5.

At step S124, the rule database 214 detemines whether it has received an access rule notice from the first utility program 30 (S112 or S114 in FIG. 5) or not.

The OS 2 moves to step S126 if an access rule notice has been received. Otherwise, the OS 2 stays at step S124.

At step S126, the rule database 214 determines whether the notice from the first utility program 30 indicates that access rules should be altered or not.

The OS 2 moves to step S128 if the notice from the first utility program 30 indicates that access rules should be altered. Otherwise, the OC 2 moves to step S130.

At step S128, the rule database 214 alters the access rules concerned according to the notice from the first utility program 30 and stores and manages the altered access rules.

At step S130, the access control unit 212 determines whether the access to the device file complies with the access rules stored in the rule database 214 or not.

The OS 2 moves to step S132 if the access to the device file complies with the access rules. Otherwise, the OS 2 moves to step S134.

At step S132, the access control unit 212 performs processing for opening the device file.

At step S234, the access control unit 212 refuses the access to the device file.

[Entire Operation]

The entire operation of the OS 2 and the first utility program 30 will be described below.

Figure 7:
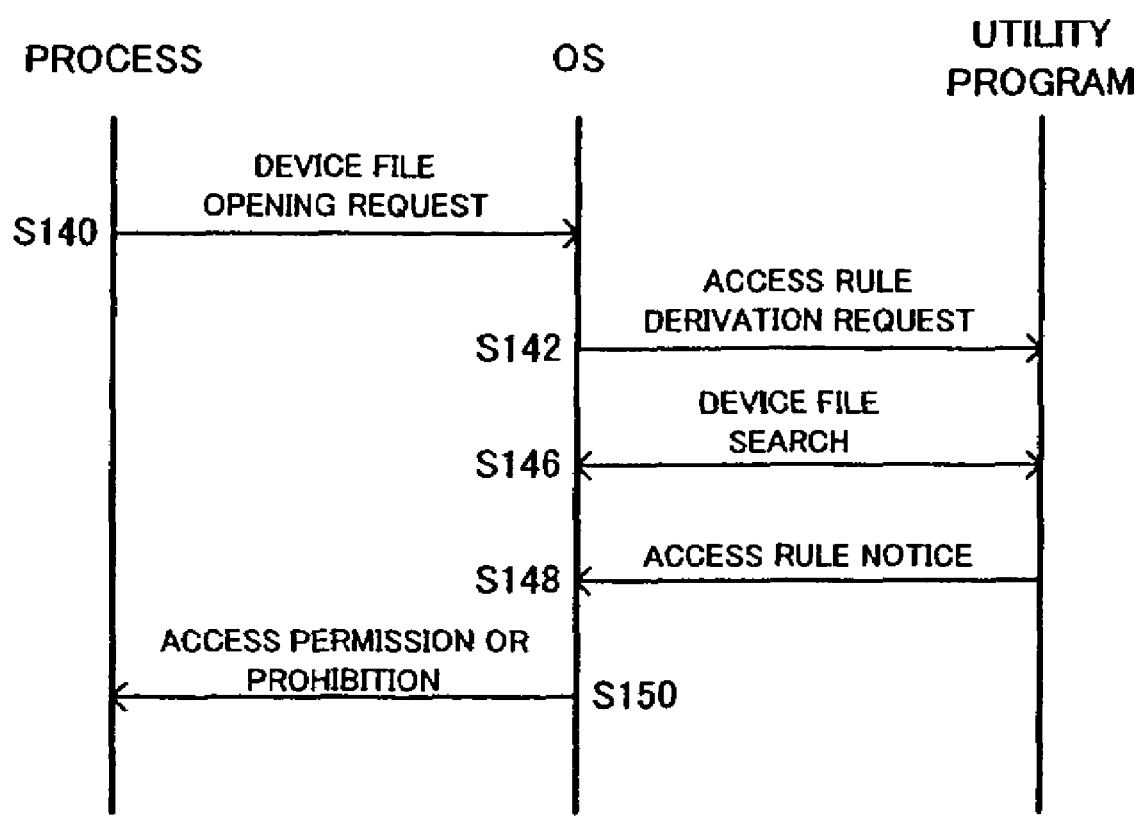
FIG. 7 is a sequence diagram of the entire operation S14 of the OS and the first utility program shown in FIG. 4.

FIG. 7 is a sequence diagram showing the entire operation S14 of the OS 2 and the first utility program 30 shown in FIG. 4.

As shown in FIG. 7, at step S140, a process 200 requests the OS 2 to open a device file directly or via a file.

At step S142, the OS 2 requests the first utility program 30 to derive a unified access rule.

At step S146, the first utility program 30 performs processing necessary for deriving a unified access rule such as a search for device files for the OS 2.

At step S148, the first utility program 30 derives a unified access rule to notify the OS 2 of it.

At step S150, the OS 2 permits or prohibits the access to the device file according to the notified rule from the first utility program 30.

Embodiment 2

A second embodiment of the invention will be hereinafter described.

The first embodiment is directed to the method in which the OS 2 sends an access rule derivation request to the first utility program 30 every time an attempt of access to a device file occurs.

However, with this method, it consumes considerable amount of time and requieres heavy processing load to access a data file because a unified access rule is derived by the first utility program 30 every time an attempt of access to a device file occurs.

To solve this problem, the second embodiment of the invention is improved in that total unified access rules are derived at a start of the OS 2 and, if setting of altering an access rule is thereafter made in the OS 2, a second utility program 32 (described later with reference to FIG. 8) derives a unified access rule.

Figure 8:
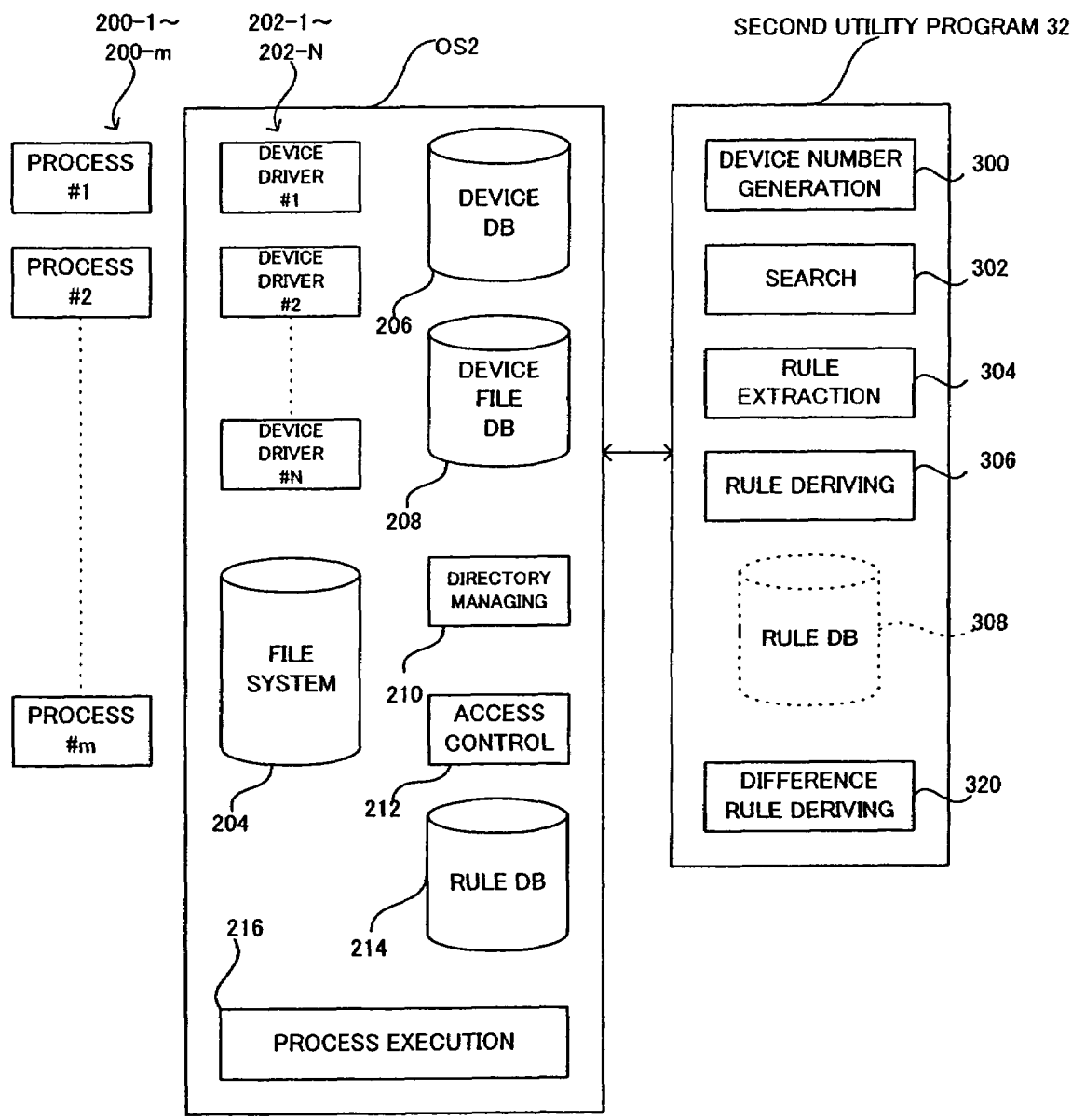
FIG. 8 shows the configuration of a second utility program.

FIG. 8 shows the configuration of the second utility program 32.

Components of the second utility program 32 shown in FIG. 8 having substantially the same components in the first utility program 30 shown in FIG. 4 are given the same reference symbols as the latter.

As shown in FIG. 8, the second utility program 32 is different from the first utility program 30 shown in FIG. 4 in that a difference rule deriving unit 320 is added.

Like the first utility program 30, the second utility program 32 is supplied to the computer 1 via the recording medium 114 or the like and runs on the computer 1.

Receiving the access rule derivation request from OS 2, the difference rule deriving unit 320 derives a unified access rule for an access file (difference) for which setting of altering an access rule has been made.

[Operations of OS 2 and Second Utility Program 32]

The operations of the OS 2 and the second utility program 32 according to the second embodiment will be described below.

Figure 9:
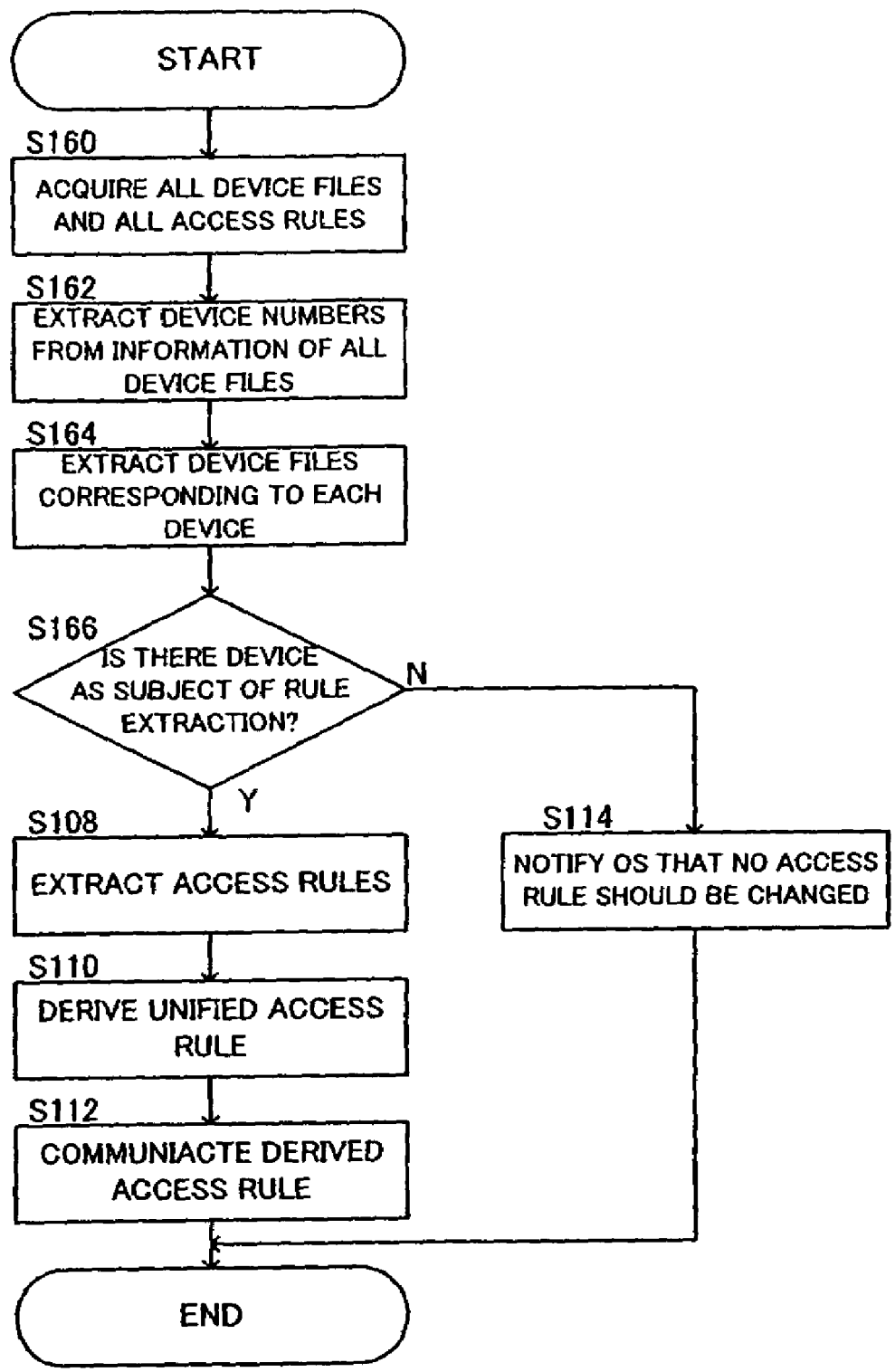
FIG. 9 is a flowchart of an operation S16 that is performed by the second utility program at its start.

FIG. 9 is a flowchart of an operation S16 that is performed by the second utility program 32 at its start.

Steps in FIG. 9 having substantially the same steps in FIG. 5 are given the same reference symbols as the latter (the same manner of notation applies to the following figures.)

Upon being started, the OS 2 starts the second utility program 32.

As shown in FIG. 9, at step S160, the search unit 302 of the second utility program 32 acquires all the access rules stored in the rule database 214 of the OS 2 and all the device files stored in the device file database 208.

At step S162, the device number generation unit 300 extracts device numbers from the information of the device files acquired at step S160.

At step S164, the rule extraction unit 304 extracts device files corresponding to each device on the basis of the device numbers obtained at step S162.

At step S166, the rule extraction unit 304 determines whether a plurality of device files are provided for a common device, that is, whether there exists a device as a subject of rule derivation or not.

The second utility program 32 moves to step S108 if there exists a device as a subject of rule derivation. Otherwise, the second utility program 32 moves to step S114.

At steps S108-S114 (see FIG. 5), the second utility program 32 derives a unified access rule(s) and notifies the OS 2 of it or them.

Figure 10:
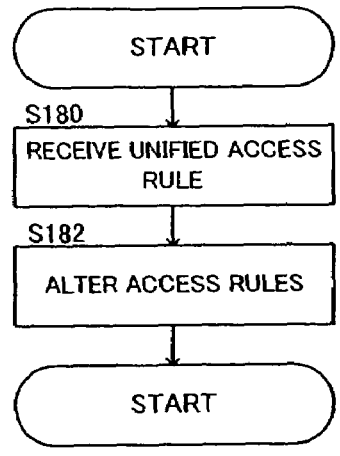
FIG. 10 is a flowchart of an operation S18 that is performed by the OS when receiving a unified access rule as a result of the second utility program's executing the process of FIG. 9.

FIG. 10 is a flowchart of an operation S18 that is performed by the OS 2 when receiving a unified access rule(s) as a result of the second utility program 32's executing the process of FIG. 9.

At step S180, the rule database 214 of the OS 2 receives a unified access rule(s) from the second utility program 32.

At step S182, the rule database 214 alters the access rules concerned according to the notice from the second utility program 32 to store and to manage the altered access rules.

From this time onward, the access control unit 212 performs an access control according to the access rules stored in and managed by the rule database 214.

Figure 12:
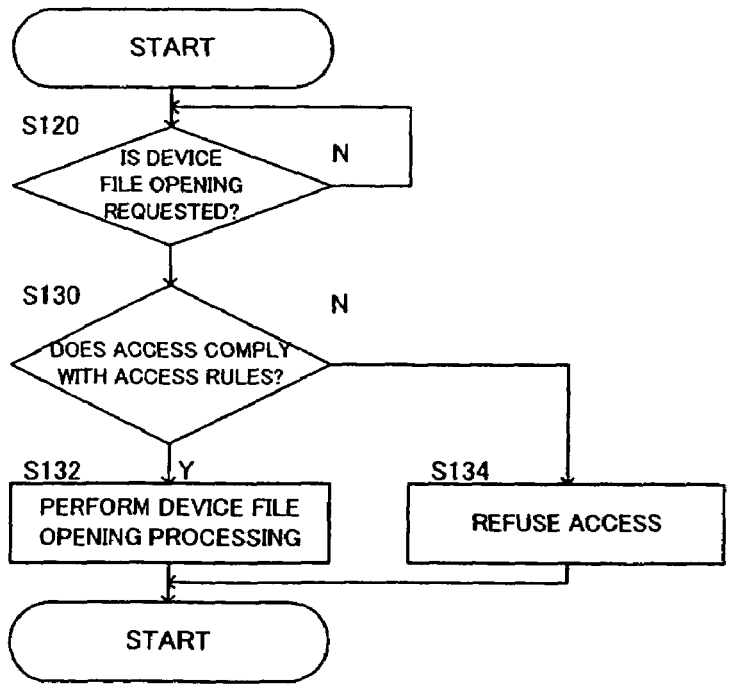
FIG. 12 is a flowchart of an access control operation S22 of the OS.
Figure 11:
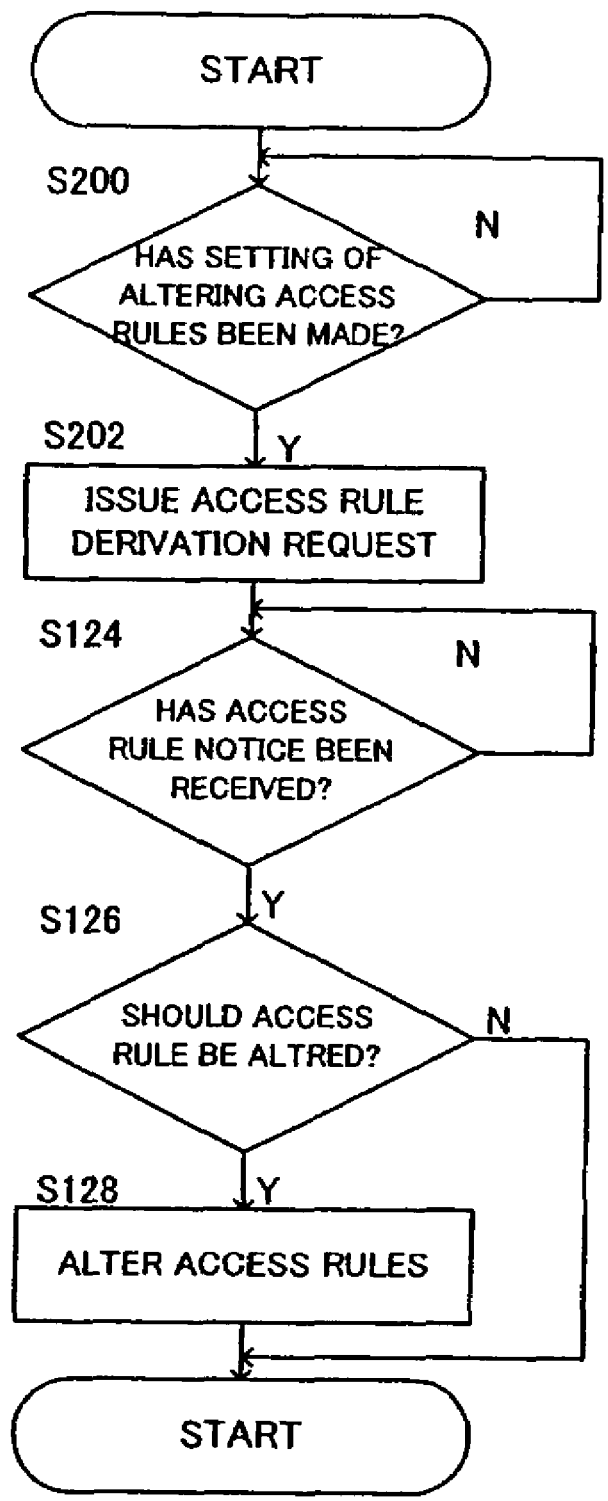
FIG. 11 is a flowchart of an operation S20 that is performed by the OS when setting of altering an access rule is made.

FIG. 11 is a flowchart of an operation S20 that is performed by the OS 2 when setting of altering an access rule is made. FIG. 12 is a flowchart of an access control operation S22 of the OS 2.

As shown in FIG. 11, at step S200, the rule database 214 determines whether setting of altering an access rule has been made or not.

The OS 2 moves to step S202 if setting of altering an access rule has been changed. Otherwise, the OS 2 stays at step S200.

Setting of altering an access rule includes not only setting of altering an access rule stored in the rule database 214 but also other kinds of setting such as setting of alteration of the directory structure by the access control unit 212 and setting of altering a device setting stored in the device database 206.

At step S202, the access control unit 212 issues, to the second utility program 32, an access rule derivation request including information relating to a device file for which an access rule has been altered (difference information; the device files for which the access rules have been altered, a device number of a device corresponding to that device file, and other information).

When receiving the access rule derivation request, the second utility program 32 derives a unified access rule for the difference (described later with reference to FIG. 13) to notifies the OS 2 of the derivation result.

At steps S124-128 (also see FIG. 6), the OS 2 alters access rules concerned according to the notice for access rules from the second utility program 32 or does not alter any access rules.

At steps S120, S130, and S132 shown in FIG. 12 (also see FIG. 6), the access control unit 212 performs an access control according to the access rules that have been altered or remain unaltered.

Figure 13:
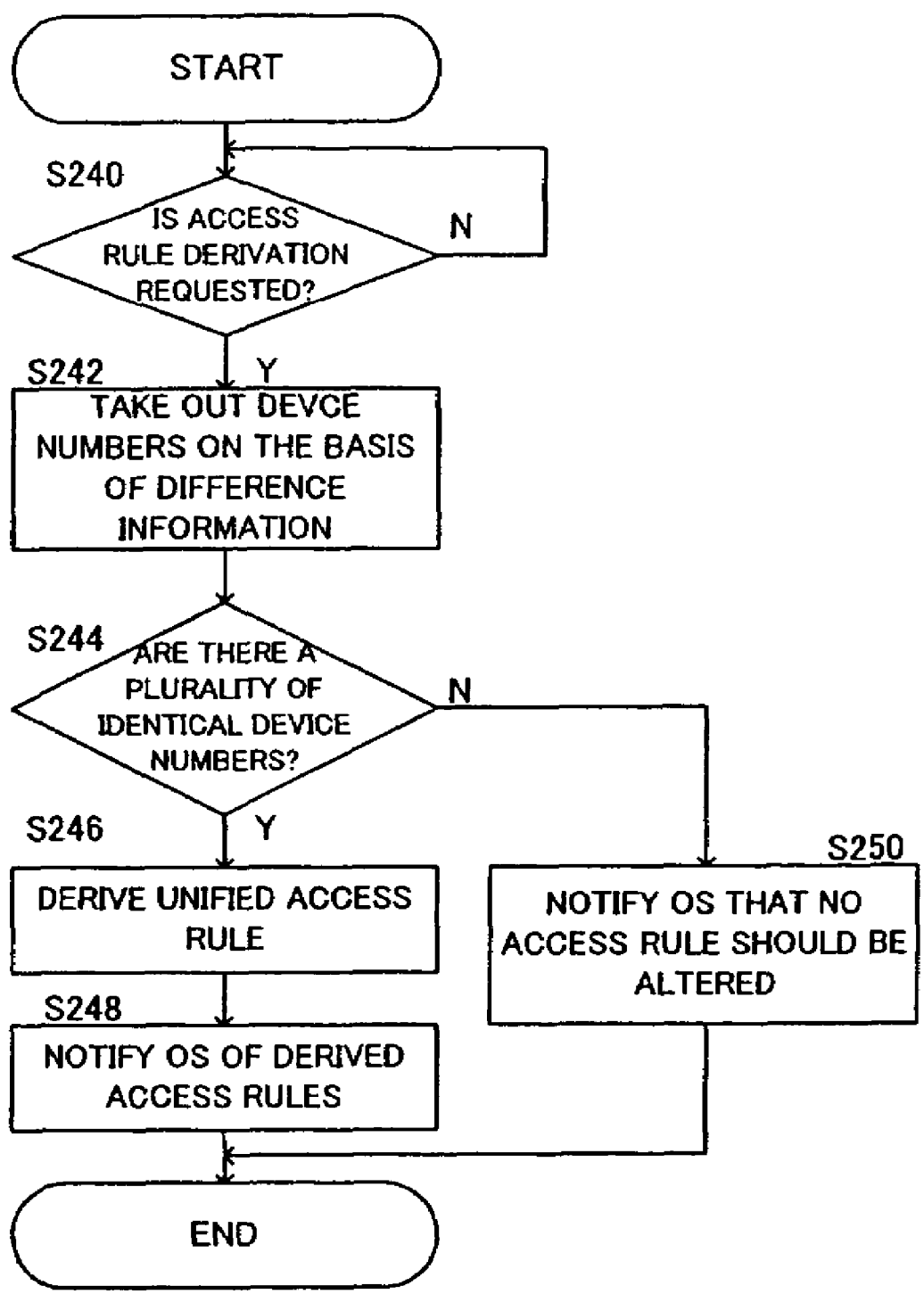
FIG. 13 is a flowchart of an operation S24 that is performed by the second utility program in response to an access rule derivation request that is issued by the operation S20 of the OS.

FIG. 13 is a flowchart of an operation S24 that is performed by the second utility program 32 in response to an access rule derivation request that is issued by the operation S20 of the OS 2 in FIG. 11.

As shown in FIG. 13, at step S240, the second utility program 32 determines whether an access rule derivation request has been received from the OS 2 or not.

The second utility program 32 moves to step S242 if it has received an access rule derivation request. Otherwise, the second utility program 32 stays at step S240.

At step S242, the device number generation unit 300 takes out device numbers from difference information received from the OS 2.

At step S244, the rule extraction unit 304 determines whether a plurality of identical device numbers are included in the device numbers that were taken out at step S242 or not.

The second utility program 32 moves to step S246 if a plurality of identical device numbers exist. Otherwise, the second utility program 32 moves to step S250.

At step S246, the difference rule deriving unit 320 derives a unified access rule for a device corresponding to the access-rule-altered device file (difference).

At step S248, the difference rule deriving unit 320 notifies the OS 2 of the unified access rule derived for the difference.

At step S250, the difference rule deriving unit 320 notifies the OS 2 that no access rules should be altered for the difference.

[Entire Operations of OS 2 and Second Utility Program 32]

The entire operations of the OS 2 and the second utility program 32 will be described below.

Figure 14:
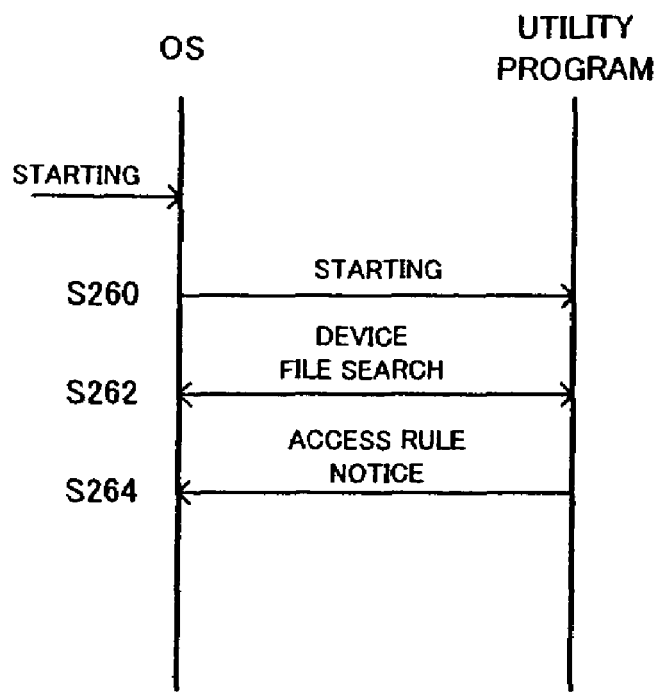
FIG. 14 is a sequence diagram of an entire operation S26 that is performed by the OS and the second utility program shown in FIG. 8 at a start.

FIG. 14 is a sequence diagram of an entire operation S26 that is performed by the OS 2 and the second utility program 32 (see FIG. 8) at a start.

As shown in FIG. 14, upon being started, the OS 2 starts the second utility program 32 at step S260.

At step S262, the utility program 32 searches the rule database 214 and the device file database 208 to acquire information necessary for deriving a unified access rule.

At step S264, the second utility program 32 notifies the OS 2 of a derived access rule.

Figure 15:
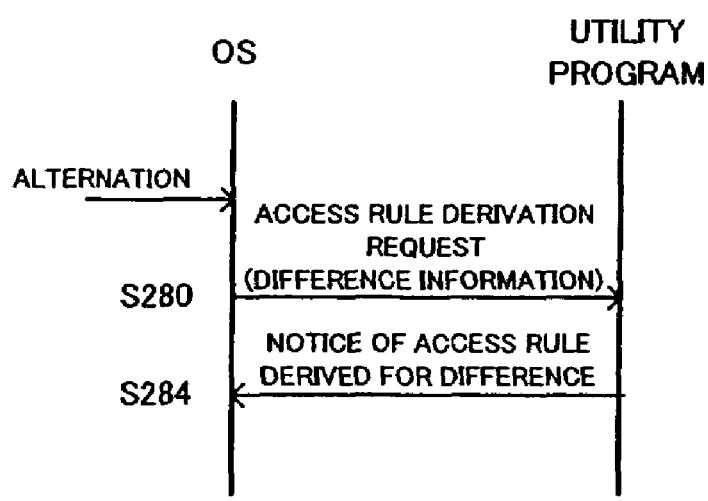
FIG. 15 is a sequence diagram of an entire operation S28 that is performed by the OS and the second utility program shown in FIG. 8 when access rules have been altered.

FIG. 15 is a sequence diagram of an entire operation S28 that is performed by the OS 2 and the second utility program 32 (see FIG. 8) when setting of altering an access rule has been made.

As shown in FIG. 15, when setting of altering an access rule has been made, at step S280 the OS 2 issues an access rule derivation request including difference information to the second utility program 32.

Receiving the access rule derivation request, the second utility program 32 derives a unified access rule for the difference in the manner shown in FIG. 13.

At step S284, the second utility program 32 notifies the OS 2 of the unified access rule derived for difference.

As described above, the access control system and method according to the invention can remedy the vulnerability of a computer OS and thereby increasing its safety.

What is claimed is:

1. An access control system, comprising:
   an operating system; and
   an access control device for controlling access from each of one or more processes executed by the operating system to one of one or more devices, wherein:
   the operating system comprises:
     a device file generating unit for generating a device file or device files for a route or each of routes through which each of the processes accesses one of the devices;
     an access rule setting unit for setting access rules indicating methods for accessing device files for each of the routes; and
     an access control unit for controlling access to each device file according to the associated access rule;
   the access control device includes:
     an access rule extracting unit for extracting access rules set for routes to a plurality of device files corresponding to a common device; and
     an access rule deriving unit for deriving a unified access rule for each device on the basis of the extracted access rules; and
   the access control unit is configured to control access to each device file according to the associated unified access rule.

2. The access control system according to claim 1, wherein:
- each route exists in one or more directories managed by the operating system and consists of one or more files linked to each other between each process and each device file; and
- each access rule is set for a directory in which a file linked to a device file exists.

3. The access control system according to claim 1, wherein:
- the access rule extracting unit is configured to extract access rules set for routes to each of a plurality of device files corresponding to each common device when the operating system is activated; and
- the access rule deriving unit is configured to derive a unified access rule for each device from the extracted access rules when the operating system is activated.

4. The access control system according to claim 1, wherein:
- the operating system is configured to, upon accepting alternation of an access rule, notify the access control device of the altered access rule;
- the access rule extracting unit is configured to extract access rules set for routes to each of a plurality of device files relating to the altered access rule when the access control device is notified of the altered access rule; and
- the access control device further comprises a difference rule deriving unit for deriving a unified access rule for each device corresponding to the altered access rule, from the extracted access rules when the access control device is notified of the altered access rule.

5. An access control device for controlling access from each of one or more processes to one of one or more devices, wherein:
- a device file or device files are generated for a route or each of routes through which each of the processes accesses one of the devices;
- access rules indicating methods for accessing device files are set for each of the routes; and
- access to each device file is controlled according to the associated access rule;
- the access control device comprising:
  - an access rule extracting unit for extracting access rules set for routes to a plurality of device files corresponding to a common device; and
  - an access rule deriving unit for deriving a unified access rule for each device on the basis of the extracted access rules, wherein access to each device file is controlled according to the associated unified access rule.

6. The access control device according to claim 5, wherein if a plurality of access rules extracted for a device are different from each other, the access rule deriving unit is configured to employ one of the plurality of different access rules as the unified access rule.

7. The access control device according to claim 5, wherein if a plurality of access rules extracted for a device are different from each other, the access rule deriving unit is configured to derive the unified access rule on the basis of characteristics of files linked to the respective device files.

8. The access control device according to claim 5, wherein if a plurality of access rules extracted for a device are different from each other, the access rule deriving unit is configured to employ a most restrict one among the plurality of different access rules as the unified access rule.

9. The access control device according to claim 5, wherein:
- the processes are executed by an operating system;
- each route exists in one or more directories managed by the operating system and consists of one or more files linked to each other between each process and each device file; and
- each access rule is set for a directory in which a file linked to a device file exists.

10. The access control device according to claim 9, wherein:
- the operating system stores the access rules;
- the access rule extracting unit is configured to extract access rules set for routes to each of a plurality of device files corresponding to each common device from the stored access rules when the operating system is activated; and
- the access rule deriving unit is configured to derive a unified access rule for each device from the extracted access rules when the operating system is activated.

11. The access control device according to claim 5, wherein each access rule indicates at least whether at least one of reading and writing on a device file by each of files linked to the device file is permitted or not.

12. The access control device according to claim 5, wherein:
- an operating system that accepts alternation of an access rule notifies the access control device of the altered access rule;
- the access rule extracting unit is configured to extract access rules set for routes to each of a plurality of device files relating to the altered access rule when the access control device is notified of the altered access rule; and
- the access control device further comprises a difference rule deriving unit for deriving a unified access rule for each device corresponding to the altered access rule, from the extracted access rules when the access control device is notified of the altered access rule.

13. An access control method of controlling access from each of one or more processes to one of one or more devices, wherein each of the processes accesses one of the devices via a device file or one of device files corresponding to the one device, the access control method comprising the steps of:
- generating a device file or device files for a route or each of routes through which each of the processes accesses one of the devices;
- setting access rules indicating methods for accessing device files for each of the routes;
- extracting access rules that are set for routes to a plurality of device files corresponding to a common device;
- deriving a unified access rule for each device on the basis of the extracted access rules; and
- controlling access to each device file according to the associated unified access rule.

14. A computer-readable medium containing a program for controlling access from each of one or more processes to one of one or more devices, wherein each of the processes accesses one of the devices via a device file or one of device files corresponding to the one device, the program, when executed by a computer, causing the computer to execute the steps of:
- generating a device file or device files for a route or each of routes through which each of the processes accesses one of the devices;
- setting access rules indicating methods for accessing device files for each of the routes;

extracting access rules that are set for routes to a plurality of device files corresponding to a common device;
deriving a unified access rule for each device on the basis of the extracted access rules; and
controlling access to each device file according to the associated unified access rule.

* * * * *